United States Patent [19]

Lin

[11] Patent Number: 4,496,384
[45] Date of Patent: Jan. 29, 1985

[54] METHOD AND APPARATUS FOR PRODUCING A CONTINUOUS GLASS FILAMENT MAT

[75] Inventor: David C. K. Lin, Newark, Ohio

[73] Assignee: Owens-Corning Fiberglas Corporation, Toledo, Ohio

[21] Appl. No.: 522,883

[22] Filed: Aug. 11, 1983

[51] Int. Cl.³ .............................................. C03B 37/06
[52] U.S. Cl. ........................................... 65/4.4; 65/5; 65/9; 65/16
[58] Field of Search ............................ 65/4.4, 5, 9, 16

[56] References Cited

U.S. PATENT DOCUMENTS

| | | | |
|---|---|---|---|
| 2,736,676 | 2/1956 | Frickert | 154/54 |
| 2,859,506 | 11/1958 | Slayter | 28/1 |
| 2,875,503 | 3/1959 | Frickert et al. | 28/1 |
| 3,172,184 | 3/1965 | Salteri et al. | 28/1 |
| 3,442,751 | 5/1969 | Langlois | 156/167 X |
| 3,445,207 | 5/1969 | Goerns | 65/4.4 X |
| 3,511,625 | 5/1970 | Pitt | 65/4.4 |
| 3,881,903 | 5/1975 | Stalego | 65/16 |
| 4,300,876 | 11/1981 | Kane et al. | 65/16 X |

*Primary Examiner*—Robert Lindsay
*Attorney, Agent, or Firm*—Ronald C. Hudgens; Philip R. Cloutier; Greg Dziegielewski

[57] ABSTRACT

A method and apparatus for producing a mat of continuous glass filaments at increased throughput while maintaining desirable tensile strength characteristics by means of a fluidic distribution system employing diagonally opposed Coanda effect surfaces.

12 Claims, 3 Drawing Figures

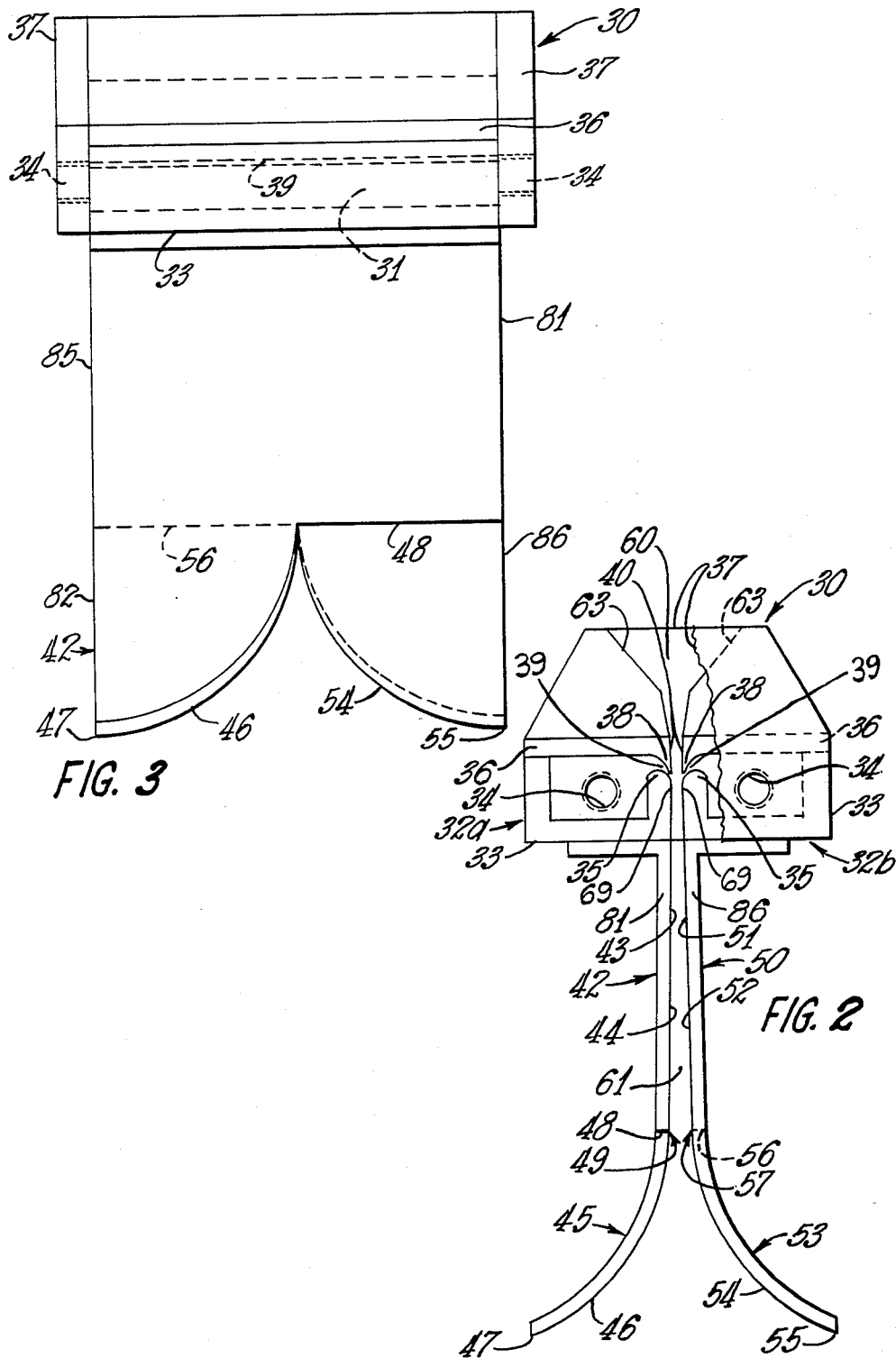

METHOD AND APPARATUS FOR PRODUCING A CONTINUOUS GLASS FILAMENT MAT

TECHNICAL FIELD

The invention disclosed herein relates to the production of mats comprised of strands of continuous glass filaments arranged in an overlapping, interengaging swirled relationship.

BACKGROUND

As with many other processes, the desire to increase the throughput and efficiency of present systems for producing continuous strand mats has been felt. The physical properties of the mat can be greatly affected by increasing the throughput of the feeder and/or the line speed of the collection conveyor, especially in those processes wherein, contemporaneously, continuous glass filaments are produced, gathered into a plurality of bundles and deposited on a moving conveyor as a mat wherein the bundles or strands arranged in a planar array are deposited across the width of the conveyor.

For example, by merely increasing the line speed of the collection conveyor, the mat produced may have more tensile strength in the machine direction as opposed to the cross machine direction.

The present invention provides a system wherein the throughput of the system can be modified such as increasing the bushing throughput and/or conveyor speed while achieving the desired tensile strength characteristics.

Further, the present invention reorients the filaments/strands in a diverging array that is substantially perpendicular to the plane of the band of strands entering the distribution system to permit the strands/filaments to be distributed across the full width of the mat without moving the distribution means.

DISCLOSURE OF THE INVENTION

The invention pertains to method and apparatus for forming a mat of continuous glass filaments comprising feeder means for supplying a plurality of streams of molten glass, pull roll means for drawing streams into said filaments; a collection surface for collecting said filaments as said mat, and distribution means comprising a first blower section adapted to supply a high velocity stream of gas, a second blower means adapted to supply a high velocity stream of gas, a first control surface terminating in a tapered, receding arcuate section, said first control surface being associated with said first blower section, a second control surface terminating in a tapered, receding arcuate section, said second control surface being associated with said second blower section, said tapered, receding arcuate sections being diagonally opposed to each other to orient said advancing filaments as a diverging planar array.

BRIEF DESCRIPTION OF THE DRAWINGS

FIG. 2 is an enlarged side view of the distribution means shown in FIG. 1.

FIG. 3 is a frontal view of the distribution means shown in FIG. 2.

BEST MODE OF CARRYING OUT THE INVENTION

Figure 1:
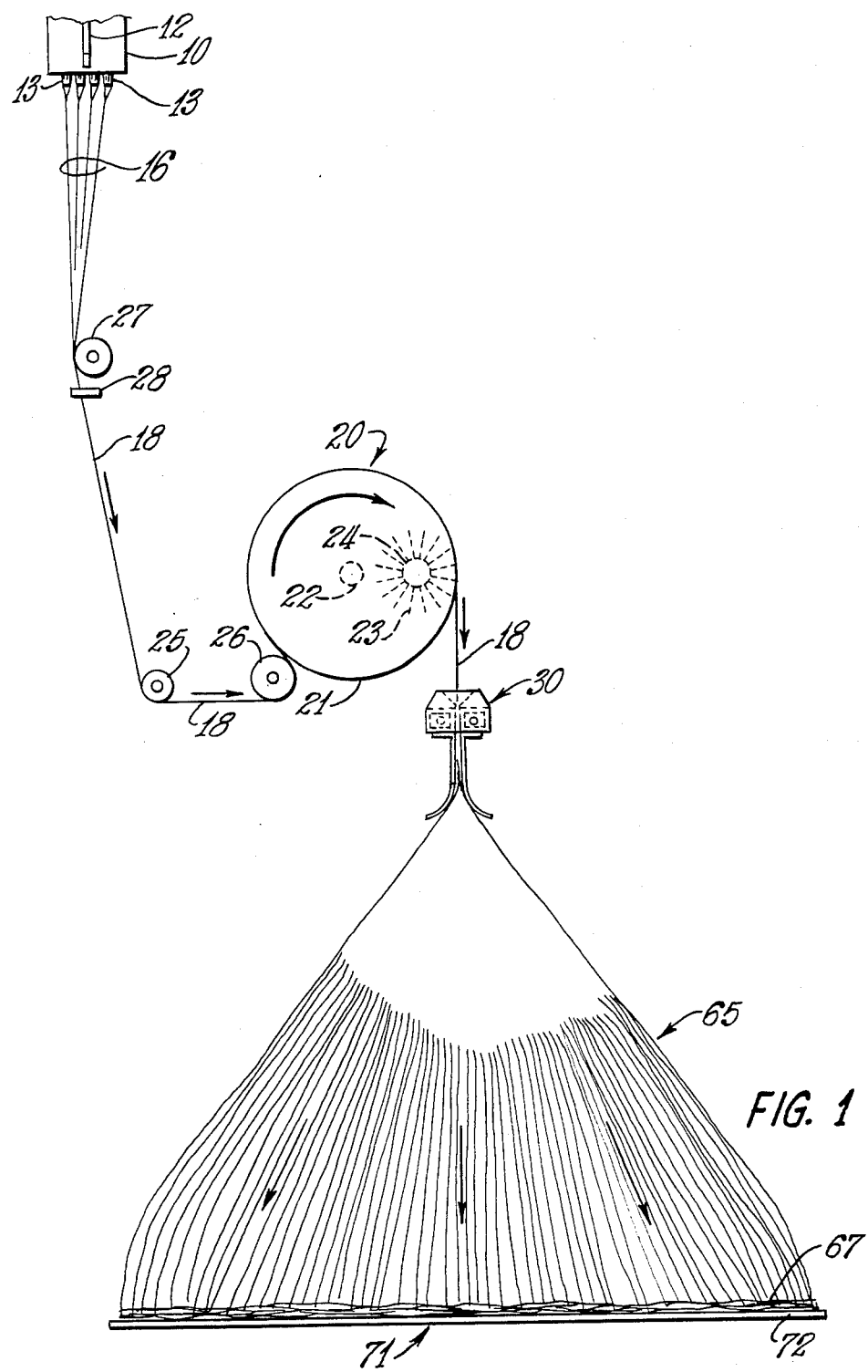
FIG. 1 is an elevational view of a fiber and mat producing system according to the principles of this invention.

As shown in FIG. 1, electrically heated feeder means 10 supplies a plurality of streams of molten inorganic material, such as glass, which are attenuated or drawn into a plurality of continuous filaments 16 through the action of attenuation means 20. Feeder 10 may be of any suitable design. As shown, feeder 10 is equipped with a pair of terminals 12 which are connected to a source of electrical energy (not shown). Further, the discharge or bottom wall is equipped with a plurality of orificed projections 13 to supply the streams of molten material, as is known in the art.

Intermediate feeder 10 and attenuation means 20 a coating means 27 supplies a protective coating or size, preferably highly lubricious, to the advancing filaments. Downstream of size applicator 27, guide or multi-grooved gathering shoe 28 gathers the plurality of filaments into a plurality of strands or bundles having a plurality of filaments in each strand. Preferably, each strand has about the same number of filaments therein. Also, guide 28 orients the strands into a planar band 18 wherein the strands are spaced apart but substantially parallel to each other.

Attentuation means 20 is comprised of a driven pull roll or wheel 21 having an axis of rotation 22, and spaced therefrom, a spoked wheel or carriage 23 having an axis of rotation 24 which is substantially parallel to axis of rotation 22. As shown in FIG. 1, the axis of rotation 22 is substantially parallel to the path of advancement (perpendicular to the plane of FIG. 1) of belt 72, or in other words, a lateral edge of mat 67. Spoked wheel 23 is positioned within pull wheel 21, and the extremities of spoked wheel 23 extend through slots in the circumferential periphery of pull wheel 21 to disengage the band 18 from the surface thereof at a predetermined point. As such, the axes of rotation 22 and 24 are fixed. The circumferential surface of pull wheel 21 is substantially flat and is adapted to maintain the band of strands 18 in a substantially spaced apart but parallel relationship. Idler rolls 25 and 26 serve to orient the band 18 as desired. Desirably, roll 25 has a plurality of parallel circumferential grooves to assist in separating the filament into an array of parallel bundles or strands.

Advancing from the surface of pull wheel 21, the band of strands 18 is distributed across the width of endless foraminous belt 72 of collection means or conveyor 71 to form mat or fibrous body 67 thereon by distribution system 30 which is rigidly fixed in position over conveyor 72. However, distribution means 30 may be journaled to be pivoted to direct the gaseous streams and array of strands back and forth across the width of conveyor, if desired. The pivot axis may be oriented as desired.

Usually, a single conveyor 71 will be served by a series of feeders 10, pull wheels 20 and distribution devices 30 (i.e., plurality of "positions") wherein a plurality of diverging planar arrays 65 of strands or filaments are deposited across the width of the conveyor to produce a mat 67 of continuous glass strands and/or filaments arranged in overlapping, interengaging, looping or swirled orientation.

According to the principles of this invention, distribution means 30 is comprised of a pair of blower sections 32a and 32b and associated with first and second members 42 and 50. Each blower sections 32a or 32b is adapted to provide a substantially uniform planar gaseous stream to contact the band of bundles of filaments 18 to advance them towards belt 72 in a predetermined manner. First and second members 42 and 50 assist in controlling the gaseous stream such that the planar array of advancing strands 65 advances toward collection means 71 in a diverging relationship as shown in FIG. 1. As the advancing strands contact the conveyor and/or mat surface, buckling of the strands to form the loops therein is achieved. For the purpose of this description, the use of the term strands contemplates "bundles of filaments" as well as "debundled filaments," since the present invention permits the choice of discharging the bundles from distribution means 30 substantially intact, or separating the bundles into smaller groups and/or individual filaments.

According to the principles of this invention, a diverging planar array of strands 65 may exhibit a width at the collection surface 72 within the range from about 10 to about 30 times, or more, the width of the band of bundles 18 entering inlet 60 of distribution means 30. Preferably, the width of the diverging array 65 at collection surface 72 is at least 12 times the width of band 18 at inlet 60, and, more preferably, the width of diverging array 65 at collection surface 72 is within the range from about 12 to about 18 times the width of band 18.

Blowers 32a and 32b have control surfaces 43 and 51 extending smoothly therefrom. Along a portion of the distal end of each control surface, a tapered, receding arcuate surface is provided to direct and control the high velocity streams of gas and the strands entrained therein to orient the strands as a diverging planar array. As will be explained later herein, the tapered, receding arcuate surfaces are "diagonally opposed" to each other.

The tapered, receding arcuate surfaces are configured to employ the Coanda effect in distributing the steams of gas having the strands entrained therein. It has been shown that such tapered, receding arcuate surfaces are very effective in reorienting the strands. Tests have shown that distribution means 30 is effective to distribute the strands across the full width of a collection means or conveyor 71 to form mat 67. As such, the width of the diverging array of filaments at the conveyor 71 was approximately 25 times the width of the band of bundles 18 entering distribution means 30 in some instances. Further, the diverging planar array 65 was oriented substantially perpendicular to the axis of rotation 22 as well as the path of advancement of belt 72 of conveyor 71. And thus, diverging planar array 65 is also substantially perpendicular to the plane of the band 18 entering distribution means 30. Due to the width of the band of bundles of filaments and the fact that the arcuate surfaces are adapted to direct the individual strands outwardly along paths substantially perpendicular to the plane of band 18, the divergent planar array 65 is not perfectly perpendicular to the path of advancement of belt 72 or band 18. However, the variation from absolute perpendicular is but a few degrees and need not be compensated for by oscillating the distribution means and the like.

First blower section 32a and second blower section 32b are substantially identical and are comprised of a body 33 joined to a cap section 36 to define in part chamber 31. Body 33 and cap section 36 are fastened together by any suitable means such as threaded fasteners. Chamber 31 is further defined by end plates 37 located at the ends of body 33 and cap section 36. At least one end plate 37 of each blower section has an inlet 34 to receive a supply of pressurized gas, such as air, to charge blowers 32a and 32b.

Contoured end 35 of body 33 is positioned adjacent contoured lip 38 of cap section 36 to form nozzle portion 39 therebetween to direct the planar, high velocity gaseous streams along control surfaces 43 and 51 of first and second members 42 and 50, which are suitably joined to blower sections 32a and 32b, respectively.

As shown, primary section 44 of first control surface 43 is substantially flat and extends smoothly from face 69 of body 33 of first blower section 32a. Similarly, primary section 52 of second member 50 extends smoothly from face 69 of second blower section 32b. At the distal ends 45 and 53 of members 42 and 50, tapered, receding arcuate sections 46 and 54 extend downwardly over a portion thereof, respectively. When distribution means 30 is assembled, the arcuate sections 46 and 54 recede from each other (i.e., curve away from the plane of band 18 entering distribution means 30) and are diagonally opposed to each other to reorient or turn the strands through an arc of almost 90 degrees from the original orientation at slotted inlet 60 of distribution means 30.

In detail, distal end 45 of first control surface 43 is comprised of two components which cooperate with similar opposing components of second control surface 51.

Regarding the first component of distal end 45, primary section 44 of first control surface 43 abruptly terminates as a substantially straight edge 48 laying within an assumed horizontal plane to define the discharge portion 49 of primary section 44. Discharge portion 49 is preferably substantially flat. Discharge portion 49 of primary section extends from about the midpoint of the width of the distal end 45 of primary section 44 to lateral edge 81 of first member 42.

The second component, a tapered, receding arcuate section 46 enters downwardly from the remainder of primary section 44. The curvature of arcuate section 46 begins along a phantom extension of straight edge 48 and extends downwardly and outwardly therefrom and terminates at bottom edge 47.

One end of edge 47 abuts edge 48 at, preferably, the midpoint of distal end 45. Edge 47 extends downwardly and outwardly to lateral edge 82 of first member 42. Thus, arcuate section 46 is "tapered". As such, the length of the arc along receding arcuate section 46 increases from 0 at the junction of edges 47 and 48 to a predetermined length at lateral edge 82. Bottom edge 47 may be straight or curved as desired.

Similarly, distal end 53 of second control surface 51 is comprised of two components which cooperate with the first control surface 45.

Regarding the first component, primary section 52 of second control surface 51 abruptly terminates as a substantially straight edge 56 laying within an assumed horizontal plane to define the discharge portion 57 of primary section 52. Discharge portion 57 is preferably substantially flat. Discharge portion 57 of primary section 52 extends from about the midpoint of the width of the distal end 53 of primary section 52 to lateral edge 85 of second member 50.

The second component, a tapered, receding arcuate section 54 extends downwardly from the remainder of primary section 52. The curvature of arcuate section 54 begins along a phantom extension of straight edge 56 and extends downwardly and outwardly therefrom and terminates at bottom edge 55.

One end of edge 55 abuts edge 56, at, preferably, the midpoint of distal end 53. Edge 55 extends downwardly and outwardly to lateral edge 86 of second member 50. Thus, arcuate section 54 is "tapered". As such, the length of the arc along receding arcuate section 54 increases from 0 at the junction of edges 56 and 57 to a predetermined length at lateral edge 82. Bottom edge 55 may be straight or curved as desired.

To form such a system, two identical blower units with identical control surfaces are merely placed face to face to provide the "diagonally opposed" positioning of the tapered, receding arcuate sections. As such, tapered, receding arcuate surface 46 of first member 42 is located opposite discharge portion 57 of second member 50; and tapered, receding arcuate section 54 of second member 50 is located directly opposite discharge portion 49 of first member 42. Absent arcuate sections 46 and 54, distal ends 45 and 53 would be substantially straight and lie in the same assumed horizontal plane.

It is believed that the expansion of the portion of the streams of gas leaving the discharge portions 49 and 57, additionally urges the strands to follow arcuate surfaces 54 and 46, respectively.

To achieve the desired Coanda effect for the streams of high velocity gas, it is preferred that the radius of curvature of receding arcuate sections 46 and 54 be within the range from about 2 inches to about 4 inches. Further, the centerlines of the radius of curvature for arcuate sections 46 and 54 are substantially parallel to each other and primary surfaces 44 and 52, band 18 entering discharge means 30 and/or axis or rotation 22.

Control chamber 61, which is formed between the halves of distribution means 30, is preferably slightly divergent. That is, first control surface 43 and second control surface 51 diverge with respect to each other along the path of advancement of the filaments and strands therebetween. Preferably the total included angle of divergence between first control surface 43 and second control surface 51 is about 2 degrees.

Preferably, the distance between first blower 32a and second blower 32b, measured at the nozzle portions 39 thereof, should be approximately 10 times the gap of nozzle 39.

Fastened to the top of each cap section 36, a beveled guide 63 assists in smoothly delivering the band 18 to inlet 60 of distribution means 30.

In operation, the band 18 of substantially parallel bundles of filaments enters distribution means 30 and is engaged on each side by the substantially planar, high velocity streams of gas issuing from first and second blower sections 32a and 32b. As the strands approach the discharge end of distribution means 30, the strands follow the curve of tapered, receding arcuate sections 46 and 54. At the bottom edges 47 and 55 of the tapered arcuate sections 46 and 54, the strands are ejected substantially tangentially from the tapered, receding curvature with the end most strands being directed most laterally outwardly while the center most strands are directed substantially straight downwardly. Because of the "taper,38 strands intermediate the center most strands and the extremities are directed laterally outwardly in a substantially uniformly graduated manner to provide a substantially uniformly spaced, diverging planar array of strands.

Coatings may be applied to the strand contacting surfaces to reduce friction and surface wear and filament abrasion, if desired.

The pressurized air supplied to chamber 35 should be suitably regulated for proper control. Further, a shim may be added between cap 36 and body 33 to modify the distance between contoured lips 35 and 38 nozzle portion 39 to, for example, modify the volume of air flowing through nozzle 39 portion. Preferably, the contours and spacing of lips 35 and 38 are formed according to the principles set forth in U.S. Pat. No. 4,316,731, issued on Feb. 23, 1982 to Lin, et al, which is hereby incorporated by reference.

Primary sections 44 and 52 of control surfaces 43 and 51, preceding the tapered, receding arcuate sections 46 and 54 may be of the divergent/convergent type as set forth in my copending U.S. patent application Ser. No. 520,091, filed on Aug. 4, 1983, which is hereby incorporated by reference.

As is known in the art, mat 67 may receive a suitable binder to adhere the strands and filaments to one another to form a unitary fibrous body. For example, see U.S. Pat. Nos. 3,442,751 and 2,875,503. Or, mat 67 may be needle punched to provide sufficient integrity, as desired.

Other features of similar distribution systems for controlling the advancing strands or filaments as set forth in concurrently filed U.S. patent application Ser. No. 522,882 filed on Aug. 11, 1983 in the name of Michael P. Dunn which is hereby incorporated by reference, may be employed.

It is apparent that, within the scope of the present invention, modifications and different arrangements can be made other than as herein disclosed. The present disclosure is merely illustrative with the invention comprehending all variations thereof.

INDUSTRIAL APPLICABILITY

The invention disclosed herein is readily applicable to the glass fiber mat industry.

I claim:

1. Apparatus for producing a mat of continuous glass filaments comprising:
    (a) feeder means for supplying a plurality of streams of molten glass;
    (b) pull roll means for drawing streams into said filaments;
    (c) means for orienting said filaments as a planar band;
    (d) a collection surface for collecting said filaments as said mat; and
    (e) distribution means for receiving said band from the pull roll means comprising:
    a first blower means adapted to supply a stream of gas;
    a second blower means adapted to supply a stream of gas, said second blower means being spaced from said first blower means, said filaments advancing from said pull roll means between said first and second blower means;
    a first control surface terminating in a tapered, receding arcuate section, said first control surface being associated with said first blower means; and
    a second control surface terminating in a tapered, receding arcuate section, said second control surface being associated with said second blower means, said tapered, receding arcuate sections being diagonally opposed to direct said gaseous streams to orient said advancing filaments as a diverging planar array for collection as said mat.

2. The apparatus of claim 1 wherein said diverging planar array is oriented substantially perpendicular to the plane of the band entering said distribution means.

3. The apparatus of claim 1 wherein the radius of curvature of the receding arcuate sections is provided to establish the flow of the stream of gas associated therewith according to the Coanda effect.

4. The apparatus of claim 3 wherein the radius of curvature of the receding arcuate sections is within the range from about 2 inches to about 4 inches.

5. The apparatus of claim 1 wherein the diverging planar array has a width equal to or greater than the width of the collection surface.

6. The apparatus of claim 4 wherein the receding arcuate sections are oriented to distribute the filaments across substantially the full width of the mat being formed.

7. The apparatus of claim 4 wherein the first control surface and second control surface have primary sections that are divergent with respect to each other.

8. The method of forming a mat of continuous glass filaments comprising:

drawing streams of molten material into continuous filaments;

orienting said filaments as a substantially planar band of substantially parallel bundles of filaments;

contacting said band with a substantially planar gaseous streams;

moving said planar gaseous streams along first and second control surfaces having diagonally opposed tapered, receding arcuate sections at the distal end thereof, the velocity of the gaseous streams and the radius of curvature of the arcuate sections being adapted to direct the filaments along the curvature of the receding arcuate sections to direct the filaments laterally outwardly along a plane substantially perpendicular to the plane of the band of bundles of filaments to form a diverging planar array of filaments; and collecting said filaments at said mat on a continuously advancing collection surface.

9. The method of claim 8 wherein said filaments of said diverging array are arranged as individual filaments and/or as bundles of said filaments.

10. The method of claim 9 wherein the width of the diverging planar array of filaments is greater than or equal to the width of the advancing collection surface.

11. The method of claim 9 wherein said diverging array defines a plane oriented substantially perpendicular to the path of advancement of said mat.

12. Apparatus for producing a mat of continuous glass filaments comprising:

(a) means for supplying a planar band of substantally parallel bundles of filaments;

(b) a collection surface for collecting said filaments as said mat along a path of advancement; and (c) distribution means for receiving said bundles of filaments comprising:

a first blower means adapted to supply a stream of gas;

a second blower means adapted to supply a stream of gas spaced from said first blower means;

a first control surface terminating in a tapered, receding arcuate section, said first control surface being associated with said first blower means; and a second control surface terminating in a tapered, receding arcuate section, said second control surface being associated with said second blower means, said tapered receding arcuate sections being diagonally opposed to each other to direct said gaseous streams to orient said advancing filaments as a diverging planar array.

* * * * *